Aug. 8, 1933.  W. H. PAULL  1,921,772
PNEUMATIC TIRE
Filed Aug. 6, 1931
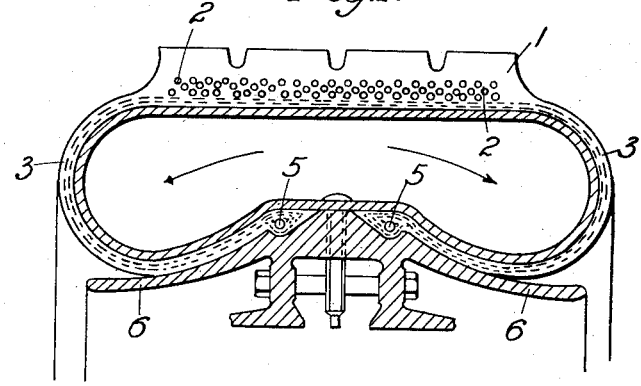
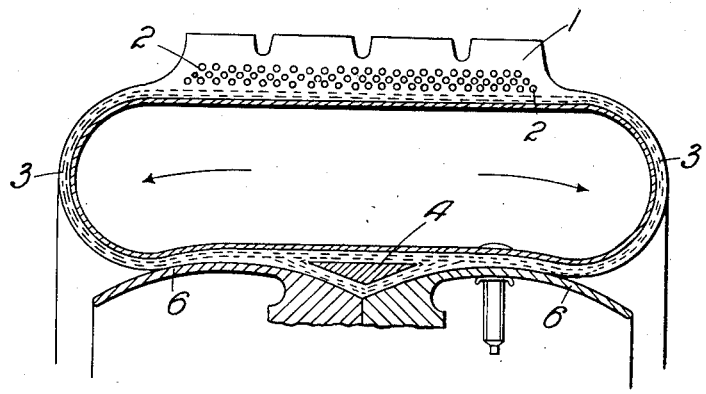
INVENTOR
Wallace Henry Paull
by Elsina & Rauber
his attorneys Patented Aug. 8, 1933

1,921,772

UNITED STATES PATENT OFFICE 1,921,772

PNEUMATIC TIRE

Wallace Henry Paull, Edgbaston, Birmingham, England, assignor to Dunlop Rubber Company Limited, London, England, a British Company Application August 6, 1931, Serial No. 555,457, and in Great Britain August 21, 1930

5 Claims. (Cl. 152—13)

The original conception of a pneumatic tire consisted in a means for retaining in a flexible casing a column of compressed air between the road surface and the rigid portion of the wheel and as pneumatic tire construction developed, it was always sought to ensure that obstacles on the road surface were absorbed momentarily within the tire tread, and thus shocks were as far as possible eliminated at the point of creation.

Running conditions have, however, largely changed, and the greater part of running mileage is to-day over modern roads having mainly smooth and hard surfaces—free from isolated obstructions. Yet the principal features of tire design and construction remain unaltered.

To-day, the rate of wear of the tire tread is largely due to movement taking place in the tread itself in the process of flexing under contact with the road surface.

This invention provides a new design and improved construction of tire, in which the self-destructive movement within the tread of the tire is eliminated, thus enabling a much longer life to be obtained from the tread. The method of construction hereinafter described also renders the tread much less liable to penetration by puncturing articles and secures the retention of the molded non-slipping design on the tread for a much longer period.

The new constructional method—while limiting the local flexing of the tread—provides for a greatly increased flexing of the tire around the sides of the base of the tire, thus making good the loss of cushioning within the tread portion, and in fact, more than making good this loss for, while flexibility of the tread permitted absorption of obstacles by local indentation, the new cushioning provided at the sides of the base of the tire more effectually takes up the shocks of lumps or pot holes, (which are to-day the more common shock producing features of roads), than was possible with tires having the more flexible tread but more rigid base of present normal construction.

Another feature of this improved tire is the greater sectional width and consequently greater load carrying capacity rendered possible without the employment of additional material.

According to this invention I provide an improved construction of pneumatic tire for use with the pneumatically tired wheel claimed in British Patent No. 344,383, which is distinguished from known types by the combination of the following features and has a cross-section initially molded substantially to the cross-section maintained under load and comprises a substantially flat and comparatively inextensible tread foundation, has relatively thin and continuously curved and flexible side walls which curve first outwards from each side of the tread and then inwards, the inward curves extending across the inner periphery of the tire towards one another in such a manner as to form a concave and flexible rim cushioning portion such that the deformation due to variations in live load is transferred from the tread and side walls in the flexible cushioning portion in which the rim floats, the tire being positioned relative to the rim either by inextensible beads formed within the edges of the tire cover for reception by suitable grooves in the outer periphery of the rim or, where it is not desired to have the cover divided at its base, being of tubular form and suitably reinforced at its base to permit of mechanical attachment to the wheel rim in known manner.

In order that my invention may be more easily understood and readily carried into effect, the same will now be described with reference to the accompanying drawing, in which—

Fig. 1 is a sectional view of the tire with a divided base, and

Fig. 2 is a sectional view of a tubular tire.

In carrying out this invention the tire is molded to a shape approximately closely to that of the shape of the tire under load.

The tread 1 is rendered circumferentially inextensible, yet flexible. This is effected here by employing layers of continuous cords or wires 2, or by employing a diagonal arrangement of cords so placed at an angle which does not permit of extension of the periphery of the tire. The side walls 3 and base 4 of the tire may be continuous, making a single tube tire, as in Fig. 2, or the base 4 may be divided and light beads 5 enclosed within the cover edges, as in Fig. 1.

The molded shape of the base of the tire is preferably that indicated in the drawings of British Patent No. 344,383, the object being to permit the tire to sit in saddle form over a convex rim with supporting side flanges 6 which, however, only operate in steadying the tire as the side walls and base are deflected radially inwards by the load or shock, a movement which might be conveniently described as a sinking of the rim into the base of the tire as load or shock comes upon the tread portion of the tire.

The molded shape of the tire, as a whole, is such that deflection under load or shock does not produce an acute bending of the tire walls 3, either at the edges of the tread or at any lower point on the side walls, but deflection of the tread results in an inward radial movement of the tire as a whole with little or no disturbance of the curvature of the side walls. Even under extreme deflections this characteristic remains, the movement resulting in the approach of the base of the tread towards the base of the rim, the air within the tire being displaced towards the side walls in the direction of the arrows and so maintaining their normal curvature.

What I claim is—

1. An improved construction of pneumatic tire of the type described which has a radial section initially molded substantially to the cross-section maintained under load and comprises a substantially flat flexible and comparatively inextensible tread formation, relatively thin and continuously curved and flexible side walls which curve first outwards from each side of the tread and then inwards, the inward curves extending across the inner periphery of the tire towards one another in such a manner as to form a concave and flexible rim cushioning portion of substantially the width of said tread portion such that the deformation due to variations in tire load is transferred from the tread and side walls to the flexible cushioning portion in which the rim floats.

2. An improved construction of pneumatic tire of the type described which has a radial section initially molded substantially to the cross-section maintained under load and comprises a substantially flat flexible and comparatively inextensible tread formation, relatively thin and continuously curved and flexible side walls which curve first outwards from each side of the tread and then inwards, the inward curves extending across the inner periphery of the tire towards one another in such a manner as to form a concave and flexible rim cushioning portion of substantially the width of said tread portion such that the deformation due to variations in tire load is transferred from the tread and side walls to the flexible cushioning portion in which the rim floats, the tire being positioned relative to the rim by inextensible beads formed within the edges of the tire cover for reception by suitable grooves in the outer periphery of the rim.

3. An improved construction of pneumatic tire of the type described which has a radial section initially molded substantially to the cross-section maintained under load and comprises a substantially flat flexible and comparatively inextensible tread formation, relatively thin and continuously curved and flexible side walls which curve first outwards from each side of the tread and then inwards, the inward curves extending across the inner periphery of the tire towards one another in such a manner as to form a concave and flexible rim cushioning portion of substantially the width of said tread portion such that the deformation due to variations in tire load is transferred from the tread and side walls to the flexible cushioning portion in which the rim floats, the tire being of tubular form and suitably reinforced at its base to permit of mechanical attachment to the wheel rim in known manner.

4. A pneumatic tire of the type described having in radial section a flat flexible tread formation that is substantially inextensible in circumferential direction, relatively thin flexible side walls extending from the side edges of said flat tread formations in a circular outwardly convex curvature under all conditions of deformation of said tire, and thence inwardly in a curvature slightly concaved in cross section toward the axis and of substantially the width of said tread.

5. A pneumatic tire of the type described having in radial section a flat flexible tread formation that is substantially inextensible in circumferential direction, relatively thin, flexible side walls extending from said edges of said flat tread formations in a circular outwardly convex curvature under all conditions of deformation of said tire and thence inwardly in a curvature slightly concave in cross section toward the axis of the tire and of substantially the width of said tread, and a rigid supporting surface contacting with said inward extension of said side walls, and concave toward the axis of the tire and of sufficient breadth to support said concave extension of said tire walls in all conditions of deformation.

WALLACE HENRY PAULL.